United States Patent
Nomura et al.

(10) Patent No.: US 10,018,095 B2
(45) Date of Patent: Jul. 10, 2018

(54) EXHAUST GAS PURIFICATION DEVICE

(71) Applicant: CATALER CORPORATION, Kakegawa-shi, Shizuoka (JP)

(72) Inventors: Yasutaka Nomura, Kakegawa (JP); Shingo Sakagami, Kakegawa (JP); Ryota Onoe, Kakegawa (JP); Yuta Morishita, Kakegawa (JP); Junji Kuriyama, Kakegawa (JP); Hiroshi Sekine, Kakegawa (JP)

(73) Assignee: CATALER CORPORATION, Kakegawa-shi (JP)

( * ) Notice: Subject to any disclaimer, the term of this patent is extended or adjusted under 35 U.S.C. 154(b) by 101 days.

(21) Appl. No.: 15/333,769

(22) Filed: Oct. 25, 2016

(65) Prior Publication Data
US 2017/0122176 A1 May 4, 2017

(30) Foreign Application Priority Data

Oct. 30, 2015 (JP) .................. 2015-215114

(51) Int. Cl.
| | | |
|---|---|---|
| *F01N 3/28* | (2006.01) | |
| *B01D 53/94* | (2006.01) | |
| *B01D 46/24* | (2006.01) | |
| *B01J 23/46* | (2006.01) | |
| *B01J 23/10* | (2006.01) | |
| *B01J 35/00* | (2006.01) | |
| *B01J 35/04* | (2006.01) | |

(52) U.S. Cl.
CPC ....... *F01N 3/2842* (2013.01); *B01D 46/2474* (2013.01); *B01D 53/94* (2013.01); *B01J 23/10* (2013.01); *B01J 23/462* (2013.01); *B01J 35/0006* (2013.01); *B01J 35/04* (2013.01); *B01D 2255/2065* (2013.01); *B01D 2255/407* (2013.01); *B01D 2255/908* (2013.01); *B01D 2255/9155* (2013.01)

(58) Field of Classification Search
CPC ..... F01N 3/2842; B01J 35/0006; B01J 35/04; B01J 23/462; B01J 23/10; B01D 53/94; B01D 46/2474; B01D 2255/407; B01D 2255/908; B01D 2255/9155; B01D 2255/2065

See application file for complete search history.

(56) References Cited

U.S. PATENT DOCUMENTS

| | | |
|---|---|---|
| 2005/0095188 A1 | 5/2005 | Matsumoto et al. |
| 2007/0104623 A1 | 5/2007 | Dettling et al. |
| 2009/0087365 A1 | 4/2009 | Klingmann et al. |

(Continued)

FOREIGN PATENT DOCUMENTS

| | | |
|---|---|---|
| DE | 10 2004 040 548 A1 | 2/2006 |
| DE | 20 2009 018 901 U1 | 5/2014 |

(Continued)

*Primary Examiner* — Anthony J Zimmer
(74) *Attorney, Agent, or Firm* — Oliff PLC

(57) ABSTRACT

The exhaust gas purification device according to the present invention includes a substrate of wall flow structure having a porous partition wall 16, and a catalyst layer held in internal pores of the partition wall 16. The catalyst layer contains, as a carrier, an OSC material having oxygen storage capacity. In the thickness direction of the partition wall 16, the porosity of the internal pores in inlet regions 16*a* is 25% or higher, and an average occupation ratio of the catalyst layer held in the internal pores is 75% or lower.

6 Claims, 6 Drawing Sheets

(56) References Cited

U.S. PATENT DOCUMENTS

| | | |
|---|---|---|
| 2009/0129995 A1 | 5/2009 | Pfeifer et al. |
| 2012/0124974 A1 | 5/2012 | Li et al. |
| 2014/0220294 A1 | 8/2014 | Ono et al. |
| 2014/0234189 A1 | 8/2014 | Clowes et al. |

FOREIGN PATENT DOCUMENTS

| | | |
|---|---|---|
| EP | 1710009 A1 | 10/2006 |
| EP | 1916029 A1 | 4/2008 |
| EP | 1985352 A2 | 10/2008 |
| EP | 2042226 A2 | 4/2009 |
| JP | 2006272288 A | 10/2006 |
| JP | 2007-185571 A | 7/2007 |
| JP | 2009-000663 A | 1/2009 |
| JP | 2009-082915 A | 4/2009 |
| JP | 2012-236180 A | 12/2012 |
| JP | 2013-043138 A | 3/2013 |
| JP | 2013-139718 A | 7/2013 |
| WO | 2003068394 A1 | 8/2003 |

EXHAUST GAS PURIFICATION DEVICE

CROSS-REFERENCE

The present application claims priority based on Japanese Patent Application No. 2015-215114, filed on Oct. 30, 2015, the entire contents of which are incorporated in the present specification by reference.

BACKGROUND OF THE INVENTION

1. Field of the Invention

The present invention relates to an exhaust gas purification device, and more particularly to an exhaust gas purification device that purifies exhaust gas emitted from an internal combustion engine such as a gasoline engine.

2. Description of the Related Art

Generally, exhaust gas emitted from internal combustion engines contains, for instance, particulate matter (PM) having carbon as a main component, as well as ash made up of unburned components, and is known to give rise to air pollution. Regulations concerning emissions of particulate matter have become stricter year after year, alongside regulations on harmful components in exhaust gas such as hydrocarbons (HC), carbon monoxide (CO), and nitrogen oxides ($NO_x$). Various technologies for trapping and removing particulate matter from exhaust gas have therefore been proposed.

For instance, particulate filters for trapping such particulate matter are provided in the exhaust passage of internal combustion engines. In gasoline engine, for instance, a certain amount of particulate matter, though smaller than that in diesel engines, is emitted together with exhaust gas. A gasoline particulate filter (GPF) may accordingly be fitted in the exhaust passage. Such particulate filters include known filters having a structure, referred to as of wall flow type, in which a substrate is configured out of multiple cells made up of a porous substance, and in which the inlets and the outlets of the multiple cells are plugged alternately (Japanese Patent Application Publication No. 2009-82915 and Japanese Patent Application Publication No. 2007-185571). In a wall flow-type particulate filter, exhaust gas that flows in through cell inlets passes through a demarcated porous cell partition wall, and is discharged out through the cell outlets. As the exhaust gas passes through the porous cell partition wall, the particulate matter is trapped within the pores inside the partition wall. Prior art relating to such filters include WO 2003/068394, Japanese Patent Application Publication No. 2006-272288, Japanese Patent Application Publication No. 2012-236180, Japanese Patent Application Publication No. 2007-185571, Japanese Patent Application Publication No. 2009-663, Japanese Patent Application Publication No. 2013-43138 and Japanese Patent Application Publication No. 2013-139718.

SUMMARY OF THE INVENTION

Approaches involving forming, in the above particulate filter, a catalyst layer on which there is supported a noble metal catalyst of rhodium, platinum, palladium or the like have been studied in recent years with a view to further increasing exhaust gas purification performance. Widely used porous carriers on which a noble metal catalyst is supported include porous carriers in which alumina and an OSC material having oxygen storage capacity (for instance, a ceria-zirconia complex oxide) are concomitantly used. Recent years have witnessed attempts at increasing the proportion of OSC material in order to realize yet higher OSC capacity in filters having such a catalyst layer. However, findings by the inventors have revealed that despite the increase in OSC capacity of a catalyst layer containing a high proportion of an OSC material, the catalyst layer however peels readily off the filter, and the desired purification performance may fail to be obtained stably.

The main object of the present invention, arrived at in the light of the above considerations, is to provide an exhaust gas purification device that is equipped with a filter catalyst of wall flow structure type and that allows realizing further improvements in purification performance while preventing peeling of a catalyst layer.

The exhaust gas purification device according to the present invention is an exhaust gas purification device that is disposed in the exhaust passage of an internal combustion engine and that purifies exhaust gas emitted from the internal combustion engine. The device has: a substrate of wall flow structure having inlet cells in which only an exhaust gas inflow end section is open, outlet cells which are adjacent to the inlet cells and in which only an exhaust gas outflow end section is open, and a porous partition wall that partitions the inlet cells and the outlet cells; and a catalyst layer held on the surface of internal pores of the partition wall. The catalyst layer contains at least a carrier made up of an OSC material having oxygen storage capacity, and a noble metal supported on the carrier. In the thickness direction of the partition wall, the porosity of the internal pores in inlet regions corresponding to up to ½ of the thickness of the partition wall from the surface of the partition wall in contact with the inlet cells towards the outlet cells, is 25% or higher, and an average occupation ratio of the catalyst layer held in the internal pores is 75% or lower.

An exhaust gas purification device having such a configuration can be made into a exhaust gas purification device of excellent durability, in which the catalyst layer does not peel readily off the surface of the internal pores, by prescribing the porosity of the internal pores in the inlet regions corresponding to up to ½ of the thickness of the partition wall from the surface of the partition wall in contact with the inlet cells towards the outlet cells, to be 25% or higher, and the average occupation ratio of the catalyst layer held in the internal pores to be 75% or lower. Therefore, the present invention succeeds in providing an optimal exhaust gas purification device in which the OSC capacity of a catalyst can be brought out over long periods of time.

In a preferred aspect of the exhaust gas purification device disclosed herein, the proportion of the OSC material in the total mass of carrier contained in the catalyst layer is 70 mass % or higher. A catalyst layer having such a high proportion of OSC material has high OSC capacity, but is prone to peeling off the surface of the internal pores. However, peeling of the catalyst layer is suppressed in the present aspect of the exhaust gas purification device, and thus high OSC capacity can be brought out stably despite the high proportion of OSC material.

In a preferred aspect of the exhaust gas purification device disclosed herein, the catalyst layer is an alumina-less layer containing no alumina (typically, no carrier made up of alumina). Alumina is highly bulky and can be a cause of increases in pressure loss. Therefore, pressure loss can be reduced by using an alumina-free catalyst layer. Although an alumina-free catalyst layer tends to peel off the surface of the internal pores, the present aspect allows maintaining stably good purification performance through suppression of peeling of the catalyst layer, despite the fact that the catalyst layer is alumina-less.

In a preferred aspect of the exhaust gas purification device disclosed herein, the porosity of the internal pores in the inlet regions is 50% or higher, and the average occupation ratio of the catalyst layer held in the internal pores is 50% or lower. An exhaust gas purification device of greater durability (catalyst layer not prone to peeling) can be obtained as a result.

In a preferred aspect of the exhaust gas purification device disclosed herein, the OSC material is made up of $CeO_2$ or a $CeO_2$—$ZrO_2$ complex oxide. Both $CeO_2$ and $CeO_2$—$ZrO_2$ complex oxides have high OSC capacity, and are thus suitable as the OSC material that is used in the exhaust gas purification device disclosed herein.

In a preferred aspect of the exhaust gas purification device disclosed herein, the internal combustion engine is a gasoline engine. The temperature of exhaust gas in gasoline engines is comparatively high, and PM does not deposit readily inside the partition wall. Accordingly, the above-described effect can be brought out more effectively in a case where the internal combustion engine is a gasoline engine.

DETAILED DESCRIPTION OF THE INVENTION

Preferred embodiments of the present invention will be explained below on the basis of drawings. Any features other than the features specifically set forth in the present description and which may be necessary for carrying out the present invention (for instance, general features pertaining to the arrangement of particulate filters in automobiles) can be regarded as instances of design matter for a person skilled in the art on the basis of known techniques in the technical field in question. The present invention can be realized on the basis of the disclosure of the present description and common technical knowledge in the relevant technical field.

Figure 1:
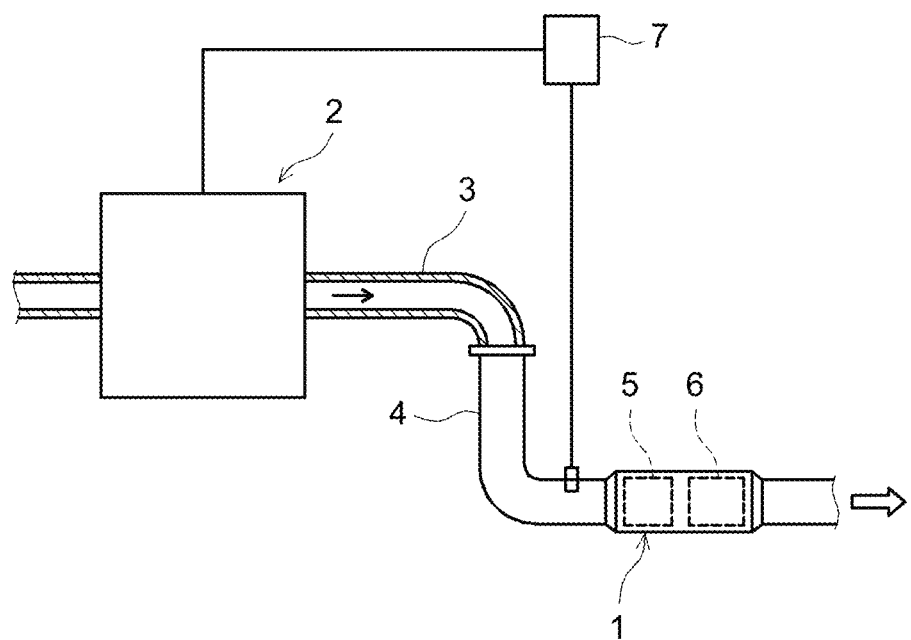
FIG. 1 is a diagram illustrating schematically an exhaust gas purification device according to an embodiment.

The configuration of an exhaust gas purification device according to an embodiment of the present invention will be explained first with reference to FIG. 1. An exhaust gas purification device 1 disclosed herein is provided in an exhaust system of the internal combustion engine. FIG. 1 is a diagram illustrating schematically an internal combustion engine 2 and the exhaust gas purification device 1 that is provided in the exhaust system of the internal combustion engine 2.

An air-fuel mixture containing oxygen and fuel gas is supplied to the internal combustion engine (engine) according to the present embodiment. In the internal combustion engine the air-fuel mixture is burned, and the combustion energy is converted to mechanical energy. The burned air-fuel mixture becomes exhaust gas that is discharged to the exhaust system. The internal combustion engine 2 having the structure illustrated in FIG. 1 is configured mainly as a gasoline engine of an automobile.

The exhaust system of the engine 2 will be explained next. An exhaust manifold 3 is connected to an exhaust port (not shown) through which the engine 2 communicates with the exhaust system. The exhaust manifold 3 is connected to an exhaust pipe 4 through which exhaust gas flows. An exhaust passage of the present embodiment is formed by the exhaust manifold 3 and the exhaust pipe 4. The arrows in the figure denote the circulation direction of the exhaust gas.

The exhaust gas purification device 1 disclosed herein is provided in the exhaust system of the engine 2. The exhaust gas purification device 1, which is equipped with a catalyst unit 5, a filter unit 6 and an ECU 7, purifies harmful components (for instance, carbon monoxide (CO), hydrocarbons (HC) and nitrogen oxides ($NO_x$)) contained in the exhaust gas that is emitted, and traps particulate matter (PM) contained in the exhaust gas.

The catalyst unit 5 is configured to be capable of purifying three-way components ($NO_x$, HC and CO) contained in the exhaust gas, and is provided in the exhaust pipe 4 that communicates with the engine 2. Specifically, the catalyst unit 5 is provided downstream in the exhaust pipe 4, as illustrated in FIG. 1. The type of the catalyst unit 5 is not particularly limited. The catalyst unit 5 may be for instance a catalyst that supports a noble metal such as platinum (Pt), palladium (Pd), rhodium (Rh) or the like. A downstream catalyst unit may be further disposed in the exhaust pipe 4, downstream of the filter unit 6. The specific configuration of the catalyst unit 5 is not a characterizing feature of the present invention, and will not be explained in detail herein.

The filter unit 6 is provided downstream of the catalyst unit 5. The filter unit 6 has a gasoline particulate filter (GPF) capable of trapping and removing particulate matter (hereafter, "PM" for short) present in the exhaust gas. The particulate filter according to the present embodiment will be explained next in detail.

Figure 2:
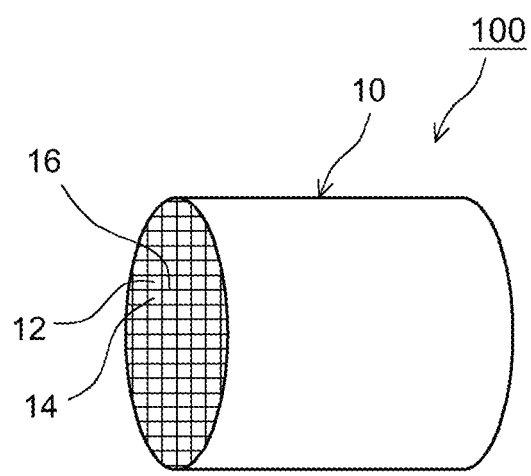
FIG. 2 is a perspective-view diagram illustrating schematically a filter of an exhaust gas purification device according to an embodiment.
Figure 3:
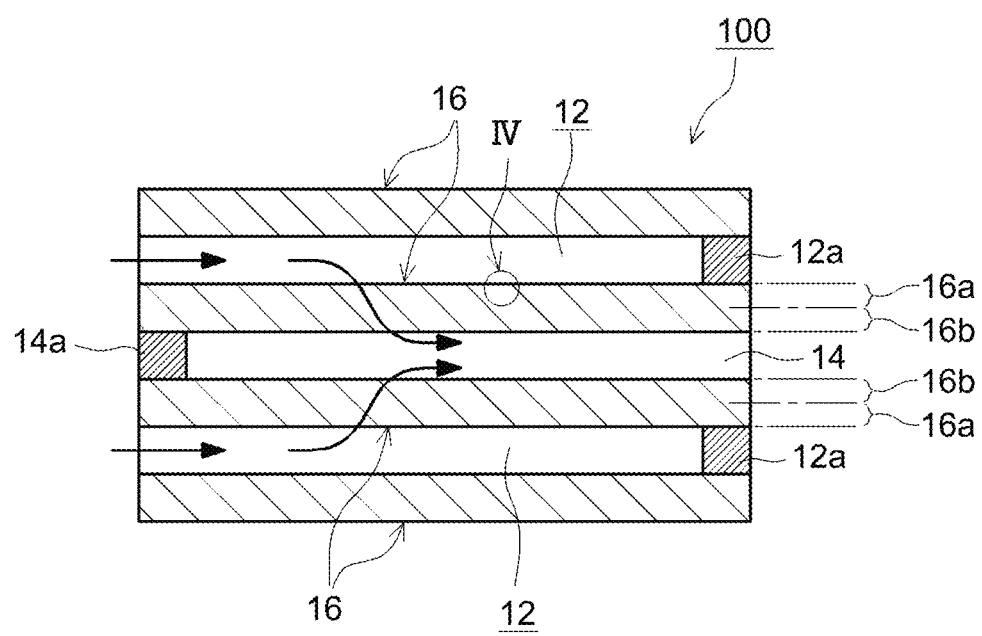
FIG. 3 is a cross-sectional diagram illustrating schematically a filter cross-section of an exhaust gas purification device according to an embodiment.
Figure 4:
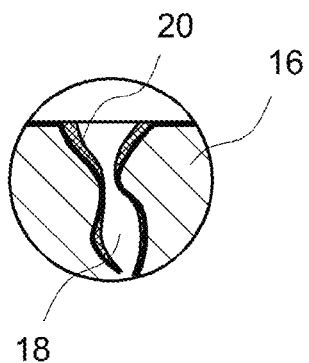
FIG. 4 is a cross-sectional schematic diagram of an enlargement of region IV in FIG. 3.

FIG. 2 is a perspective-view diagram of a particulate filter 100. FIG. 3 is a schematic diagram of an enlargement of part of a cross-section of the particulate filter 100, cut in the axial direction. As illustrated in FIG. 2 and FIG. 3, the particulate filter 100 is provided with a substrate 10 having a wall flow structure, and with a catalyst layer 20 (FIG. 4). The substrate 10 and the catalyst layer 20 will be explained next in this order.

(Substrate 10)

As the substrate 10 there can be used conventional substrates of various materials and forms that are used in this kind of applications. For instance, substrates formed out of a ceramic such as cordierite, silicon carbide (SiC) or the like, or out of an alloy (stainless steel or the like) can be suitably used herein. Illustrative examples include substrates having a cylindrical outer shape (the present embodiment). However, an elliptic cylinder shape or polygonal cylinder shape may be adopted, instead of a cylinder, as the outer shape of the substrate as a whole. The substrate 10 has inlet cells 12 in which only an exhaust gas inflow end section is open, outlet cells 14 which are adjacent to the inlet cells 12 and in which only an exhaust gas outflow end section is open, and a porous partition wall 16 that partitions the inlet cells 12 and the outlet cells 14.

(Inlet Cells 12 and Outlet Cells 14)

In the inlet cells 12 only the exhaust gas inflow end section is open. In the outlet cells 14, which are adjacent to the inlet cells 12, only the exhaust gas outflow end section is open. In this embodiment, the exhaust gas outflow end section of the inlet cells 12 is plugged by a sealing section 12a, and the exhaust gas inflow end section of the outlet cells 14 is plugged by a sealing section 14a. The inlet cells 12 and the outlet cells 14 may be set to have an appropriate shape and size taking into consideration the flow rate and components of the exhaust gas that is supplied to the filter 100. For instance, the inlet cells 12 and the outlet cells 14 may adopt various geometrical shapes, for instance a rectangular shape including squares, parallelograms, rectangles and trapezoids, and also triangles and other polygons (for instance, hexagons, octagons), as well as circular shapes.

(Partition Wall 16)

The partition wall 16 is formed between the inlet cells 12 and the outlet cells 14 adjacent to each other. The inlet cells 12 and the outlet cells 14 are partitioned by the partition wall 16. The partition wall 16 has a porous structure that allows exhaust gas to pass therethrough. The average pore diameter of the partition wall 16 is not particularly limited, but is about 5 μm to 30 μm, preferably 10 μm to 25 μm, in terms of PM trapping efficiency and suppression of increases in pressure loss. Such average pore diameter of the partition wall 16 is preferable also from the viewpoint of forming a thin catalyst layer 20 in the internal pores of the partition wall 16. The thickness of the partition wall 16 is not particularly limited, but may be of about 0.2 mm to 1.6 mm. Within such a range of partition wall thickness it becomes possible to achieve the effect of suppressing increases in pressure loss, without compromising PM trapping efficiency. The above thickness of the partition wall 16 is preferable also from the viewpoint of forming a thin catalyst layer in the internal pores of the partition wall 16.

(Catalyst Layer 20)

FIG. 4 is an enlarged schematic diagram of an enlargement of region IV in FIG. 3. As illustrated in FIG. 4, the catalyst layer 20 is provided inside the partition wall 16. In further detail, the catalyst layer 20 is held on the wall surface of internal pores 18 of the partition wall 16. The catalyst layer 20 contains at least a carrier made up of an OSC material having oxygen storage capacity, and a noble metal supported on the carrier.

In the present specification, the wording "catalyst layer held in the internal pores of the partition wall" signifies that the catalyst layer is present mainly not on the surface (i.e. exterior) of the partition wall, but inside the partition wall (wall surface of internal pores). More specifically, for instance the cross-section of the substrate is observed under an electronic microscope, and the total coating amount of the catalyst layer is set to 100%. In this case, the above wording signifies that the coating amount fraction that is present on the wall surface of the internal pores of the partition wall is typically 90% or more, for instance 95% or more, preferably 98% or more, and further 99% or more, and is in particular substantially 100% (i.e. substantially no catalyst layer is present on the surface of the partition wall). This is therefore clearly distinguished from an instance where, for instance, part of the catalyst layer, when the latter is arranged on the surface of the partition wall, penetrates unintentionally into the internal pores of the partition wall.

In the particulate filter 100 disclosed herein the porosity of the internal pores 18 (partition wall 16) in inlet regions 16a corresponding to up to ½ of the thickness of the partition wall 16 from the surface of the partition wall 16 in contact with the inlet cells 12 towards the outlet cells 14, in the thickness direction of the partition wall 16 as illustrated in FIG. 3 and FIG. 4, takes on a value of 25% or higher. In the inlet regions 16a, the average occupation ratio of the catalyst layer 20 held in the internal pores 18 is 75% or lower. As a result, the catalyst layer 20 does not peel readily off the surface of the internal pores 18, and a particulate filter 100 of excellent durability can be achieved.

Conceivable reasons why such an effect is elicited include, although not particularly limited to, the following. From the viewpoint of enhancing OSC capacity, specifically, the carrier that supports the noble metal contains preferably an OSC material having oxygen storage capacity. However, a catalyst layer 20 containing an OSC material as a carrier has weak adhesion strength and peels readily off the surface of the pores 18 when the exhaust gas passes through the partition wall 16. In particular, peeling of the catalyst layer 20 is prone to occur at the inlet regions 16a of the partition wall 16 at which the pressure of the passing exhaust gas is comparatively high. By contrast, in a particulate filter 100 in which the porosity of the internal pores 18 in the inlet regions 16a is set to be 25% or higher and the average occupation ratio of the catalyst layer 20 held in the internal pores 18 is set to be 75% or lower, the exhaust gas passes readily through the internal pores 18 of the partition wall 16, and the pressure of the exhaust gas is not transmitted readily to the catalyst layer 20. It is found that this contributes to suppressing peeling of the catalyst layer 20. The wording "inlet regions of the partition wall" denotes regions, from among the entirety of the partition wall, in which porosity and average occupation ratio are to be evaluated. In the technology disclosed herein, therefore, the region in which the catalyst layer is formed is not limited to the inlet regions of the partition wall. For instance, the catalyst can be formed preferably not only in the inlet regions of the partition wall but also in regions (below-described outlet regions) other than the inlet regions.

The porosity in the inlet regions 16a of the partition wall 16 is about 25% or higher. The porosity in the inlet regions 16a is preferably 30% or higher, more preferably 50% or higher, yet more preferably 65% or higher and particularly preferably 80% or higher, for instance in terms of, for example, suppressing peeling of the catalyst layer 20 and curtailing increases in pressure loss of the catalyst layer 20. The upper limit of the porosity in the inlet regions 16a is not particularly limited, but is appropriately about 90% or lower and preferably 85% or lower, for instance in terms of the mechanical strength of the filter 100. For instance, a partition wall 16 in which the porosity in the inlet regions 16a lies in the range of 25% to 90% (preferably, 50% to 85%) is preferred in terms of achieving both suppression of peeling of the catalyst layer and enhanced mechanical strength, at a high level. A value measured in accordance with a mercury intrusion technique can be taken in the present specification as the porosity of the partition wall.

In the inlet regions 16a, the average occupation ratio of the catalyst layer 20 held in the internal pores 18 is about 75% or lower. Peeling of the catalyst layer 20 can be properly suppressed when the catalyst layer 20 is a thin layer that takes up thus a low proportion (occupation ratio) of the internal pores. The average occupation ratio of the catalyst layer 20 in the inlet regions 16a is preferably 60% or lower, more preferably 50% or lower, yet more preferably 30% or lower and particularly preferably 20% or lower, for instance in terms of suppressing peeling of the catalyst layer 20. The lower limit of the average occupation ratio of the catalyst layer 20 in the inlet regions 16a is not particularly limited, but is appropriately set to be about 5% or higher, preferably 10% or higher and more preferably 15% or higher from the viewpoint of enhancing purification performance. For instance, a particulate filter 100 in which the average occupation ratio of the catalyst layer 20 in the inlet regions 16a lies in the range of 10% to 75% (preferably, 15% to 50%) is preferred herein in terms of achieving both suppression of peeling of the catalyst layer and enhanced purification performance, at a high level.

In the description, the occupation ratio of the catalyst layer held in the internal pores of the present partition wall is calculated as follows.

(1) Using a scanning electronic microscope (SEM) or transmission electronic microscope (TEM) there are observed internal pores, having the catalyst layer held therein, in a cross-sectional SEM image or cross-sectional TEM image of the partition wall. Isolation of the pores is initiated from the site, within the image, at which the largest pore diameter can be accommodated.

(2) In the case of connected pores, a given pore is demarcated at the site where the diameter has narrowed down to 50% of the largest pore diameter, and is isolated as one pore (the catalyst layer is processed herein as pores).

(3) The diameter of an ideal circle (true circle) having the same surface area as the surface area X of the pore calculated from the isolated pore image is calculated herein as the pore diameter of the pore.

(4) The surface area Y of the catalyst layer held in the pore is calculated from the isolated pore image, and the percentage of the value resulting from dividing the surface area Y of the catalyst layer by the surface area X of the pore (i.e. 100×Y/X) is calculated as the occupation ratio (%) of the catalyst layer.

(5) There is isolated the pore of next larger pore diameter to the pore having been isolated in (1) above.

Thereafter, the process from (2) to (5) is repeated until the pore diameter of the isolated pore is 5 μm or smaller, to work out as a result the pore diameter of the pores provided inside the partition wall, as well as the occupation ratio of the catalyst layer held in the pores. The average occupation ratio of the catalyst layer can be derived by working out the arithmetic average of the occupation ratios of the catalyst layer in respective pores. The pore diameter of the pores and the occupation ratio of the catalyst layer can be worked out using image analysis software that is run in a computer that performs predetermined processing in accordance with a predetermined program.

Suitable examples of the particulate filter 100 disclosed herein include for instance a particulate filter in which the porosity of the internal pores 18 in the inlet regions 16a of the partition wall 16 is 25% to 90%, and the average occupation ratio of the catalyst layer 20 held in the internal pores 18 is 5% to 75%; a particulate filter in which the porosity of the internal pores 18 in the inlet regions 16a of the partition wall 16 is 40% to 85%, and the average occupation ratio of the catalyst layer 20 held in the internal pores 18 is 10% to 60%; and a particulate filter in which the porosity of the internal pores 18 in the inlet regions 16a of the partition wall 16 is 50% to 85%, and the average occupation ratio of the catalyst layer 20 held in the internal pores 18 is 15% to 50%. High OSC capacity can be brought out stably and an optimal exhaust gas purification device can be achieved within such ranges of porosity of the partition wall 16 and average occupation ratio.

The catalyst layer 20 can be formed also in a region other than the inlet regions 16a of the partition wall 16, i.e. in a portion (interior of the pores in that portion) corresponding to up to 50% to 100% of the thickness of the partition wall 16 from the surface of the partition wall 16 in contact with the inlet cells 12 towards the outlet cells 14. In other words, the catalyst layer 20 may be formed in internal pores of outlet regions 16b corresponding to up to ½ of the thickness of the partition wall 16, from the surface of the partition wall 16 in contact with the outlet cells 14 towards the inlet cells 12. The porosity of the internal pores in the outlet regions 16b of the partition wall 16 and the average occupation ratio of the catalyst layer held in these internal pores is not particularly limited.

The porosity in the outlet regions 16b of the partition wall 16 may identical to or different from the porosity in the inlet regions 16a described above. For instance, the porosity in the outlet regions 16b is appropriately about 25% or higher, and is preferably 40% or higher, more preferably 50% or higher, and yet more preferably 55% or higher, in terms of suppressing increases in pressure loss. The porosity in the outlet regions 16b is appropriately set to about 95% or lower, and preferably 80% or lower, more preferably 70% or lower, and yet more preferably 65% or lower, from the viewpoint of mechanical strength. For instance, a partition wall 16 in which the porosity of the outlet regions 16b lies in the range of 50% to 70% (preferably, 55% to 65%) is preferred in terms of achieving both reductions in pressure loss and enhanced mechanical strength, at a high level.

The average occupation ratio of the catalyst layer held in the internal pores in the outlet regions 16b may be identical to or different from the average occupation ratio of the catalyst layer held in the internal pores in the inlet regions 16a described above. For instance, the average occupation ratio of the catalyst layer in the outlet regions 16b is appropriately set to be about 90% or lower, preferably 80% or lower, more preferably 75% or lower, and yet more preferably 50% or lower, from the viewpoint of suppressing increases in pressure loss. The average occupation ratio of the catalyst layer in the outlet regions 16b is appropriately set to about 0% or higher, and for instance 5% or higher, typically 10% or higher (for instance, 15% or higher) from the viewpoint of enhancing purification performance. The average occupation ratio of the catalyst layer in the outlet regions 16b may be 0% (i.e. outlet regions 16b having substantially no catalyst layer formed therein).

(Noble Metal)

The catalyst layer 20 contains a noble metal and a carrier that supports the noble metal. It suffices herein that the noble metal in the catalyst layer 20 has a catalytic function towards harmful components contained in the exhaust gas. Examples of noble metal that can be used include for instance palladium (Pd), rhodium (Rh), platinum (Pt), ruthenium (Ru), iridium (Ir), osmium (Os) and the like.

(Carrier)

The carrier that supports the noble metal contains an OSC material having oxygen storage capacity, as described above. The OSC material stores oxygen present in the exhaust gas when the air-fuel ratio in the exhaust gas is lean (i.e. oxygen-rich atmosphere), and serves to facilitate reduction of $NO_x$ in the exhaust gas by making the exhaust gas into a reducing atmosphere. The OSC material releases the stored oxygen when the air-fuel ratio in the exhaust gas is rich (i.e. fuel-rich atmosphere), and serves to facilitate oxidation of CO and HC in the exhaust gas by making the exhaust gas into an oxidizing atmosphere. The OSC capacity of the catalyst can be thus further improved by including an OSC material having oxygen storage capacity as the carrier that supports the noble metal.

Examples of the OSC material include for instance cerium oxide (ceria: $CeO_2$) and complex oxides containing such ceria (for instance, a ceria-zirconia complex oxide ($CeO_2$—$ZrO_2$ complex oxide)). Variations in the oxygen concentration in the catalyst layer can be mitigated, and stable catalyst performance obtained, by using $CeO_2$ or a $CeO_2$—$ZrO_2$ complex oxide as the carrier of the noble metal. Yet better catalyst performance can be reliably brought out as a result. A $CeO_2$—$ZrO_2$ complex oxide is preferably used among the OSC materials described above. Growth of $CeO_2$ particles is suppressed, and it becomes possible to curtail drops in OSC capacity after endurance, through formation of a solid solution of $ZrO_2$ in $CeO_2$. The mixing proportion of $CeO_2$ and $ZrO_2$ in the $CeO_2$—$ZrO_2$ complex oxide may be $CeO_2/ZrO_2$=0.25 to 0.75 (preferably 0.3 to 0.6, more preferably about 0.5). High OSC (oxygen storage capacity) can be realized when the ratio $CeO_2/ZrO_2$ is set to lie within the above range.

Other materials (typically, inorganic oxides) may be added, as an auxiliary component, to the OSC material. Rare earth elements such as lanthanum (La), yttrium (Y) or the like, alkaline earth elements such as calcium, as well as other transition metal elements can be used as substances that can be added to the carrier. Among the foregoing, rare earth elements such as lanthanum, yttrium or the like allow increasing the specific surface area at high temperature without impairing the catalytic function, and hence are suitably used as stabilizers.

The catalyst layer 20 disclosed herein may contain a material (non-OSC material) other than the OSC material. The non-OSC material may support a noble metal, or may have no noble metal supported thereon. Examples of such non-OSC materials include for instance metal oxides such as alumina ($Al_2O_3$), silica ($SiO_2$), magnesia (MgO), titanium oxide (titania: $TiO_2$) and solid solutions of the foregoing.

The technology disclosed herein can be preferably realized in an aspect where the proportion of the OSC material in the total mass of the carrier contained in the catalyst layer 20 is 70 mass % or higher. The proportion of the OSC material is preferably 80 mass % or higher, more preferably 85 mass % or higher, yet more preferably 90 mass % or higher, and particularly preferably 95 mass % or higher (typically, 98 mass % or higher). The higher the proportion of the OSC material, the greater can be the increase of the OSC capacity of the catalyst, but the likelier becomes peeling of the catalyst layer 20 from the surface of the internal pores 18. In the present aspect, however, high OSC capacity can be maintained stably over long periods of time through suppression of peeling of the catalyst layer 20 as described above.

The catalyst layer 20 disclosed herein is preferably an alumina-less layer containing no alumina. In a preferred aspect, specifically, the catalyst layer 20 can be formed by causing a noble metal to be supported on a carrier (typically, in powder form) that contains at least an OSC material other than alumina. Alumina is highly bulky and can be a cause of increases in pressure loss. Therefore, pressure loss can be reduced by using an alumina-free catalyst layer 20. Although an alumina-free catalyst layer 20 has weak adhesion, and tends to peel off the surface of the internal pores, the present aspect allows maintaining stably good purification performance through suppression of peeling of the catalyst layer 20, as described above, despite the fact that the catalyst layer 20 is alumina-less.

The amount of noble metal supported on the carrier is not particularly limited, but it is appropriate to set the amount to lie in the range of 0.01 mass % to 2 mass % (for instance, 0.05 mass % to 1 mass %) with respect to the total mass of the carrier that supports the noble metal in the catalyst layer 20. The method for supporting the noble metal on the carrier of the catalyst layer 20 is not particularly limited. For instance, a noble metal-supporting carrier can be prepared by impregnating a carrier powder containing $Al_2O_3$ and/or a $CeO_2$—$ZrO_2$ complex oxide with an aqueous solution that contains a noble metal salt (for instance, a nitrate) or a noble metal complex (for instance, a tetraammine complex), followed by drying and firing.

Besides the above-described noble metal and carrier, the catalyst layer 20 may contain a $NO_x$ absorbent material having $NO_x$ storage capacity. It suffices herein that the $NO_x$ absorbent material has $NO_x$ storage capacity of absorbing $NO_x$ in the exhaust gas in a state where the air-fuel ratio of the exhaust gas is lean, with oxygen excess, and releasing the absorbed $NO_x$ when the air-fuel ratio is switched to rich. A basic material containing one, two or more types of metal capable of donating electrons to $NO_x$ can be preferably used herein as such $NO_x$ absorbent material. Examples include for instance alkali metals such as potassium (K), sodium (Na) and cesium (Cs), alkaline-earth metals such as barium (Ba) and calcium (Ca), rare earths such as lanthanides, and transition metals such as silver (Ag), copper (Cu), iron (Fe), iridium (Ir) and the like. Among the foregoing, barium compounds (for instance, barium sulfate) have high $NO_x$ storage capacity, and are therefore preferred as the $NO_x$ absorbent material that is used in the exhaust gas purification device disclosed herein.

(Coating Amount of the Catalyst Layer)

The coating amount of the catalyst layer is not particularly limited, so long as the average occupation ratio of the catalyst layer 20 in the inlet regions 16a of the partition wall 16 satisfies the above ranges, but is about 140 g/L or less, preferably 120 g/L or less, more preferably less than 100 g/L, yet more preferably 80 g/L or less and particularly preferably 65 g/L or less, per L of volume of substrate. Thanks to the present configuration, the purification performance on exhaust gas can be effectively enhanced, while reducing the coating amount of the catalyst layer in the filter as a whole (and thus while reducing pressure loss and lowering costs), since the amount of OSC material can be increased with respect to that in conventional instances. Therefore, it becomes possible to realize a high-performance exhaust gas purification device (for instance, in that there is no increase in pressure loss during passage of exhaust gas through the substrate) that boasts excellent purification performance despite such small amount of coating amount of catalyst layer, for instance 140 g/L or less (preferably less than 100 g/L, more preferably 80 g/L or less, and yet more preferably 65 g/L or less) per L of volume of substrate. The lower limit of the coating amount of the catalyst layer is not particularly limited, but is preferably 30 g/L or more, more preferably 40 g/L or more and yet more preferably 50 g/L or more in terms for instance of enhancing purification performance. The technology disclosed herein can be preferably realized in an aspect where the coating amount of the catalyst layer lies in the range of 60 g/L to 120 g/L per L of volume of substrate.

(Method for Forming the Catalyst Layer 20)

To form the catalyst layer 20, a slurry for catalyst layer formation may be prepared that contains at least a powder resulting from supporting a noble metal on a carrier containing an OSC material, and an appropriate solvent (for instance, deionized water).

The viscosity of the slurry is one important factor herein in terms of achieving the above-described average occupation ratio of the catalyst layer. Specifically, the viscosity of the slurry may be adjusted as appropriate in such a manner that the slurry is spread thinly on the surface of the internal pores of the partition wall. Preferably, the viscosity of the slurry at a shear rate of 4 s$^{-1}$ can be 8000 mPa·s or lower, (for instance, 1 mPa·s to 8000 mPa·S), preferably in the range of 3 mPa·s to 4000 mPa·s, more preferably 5 mPa·s to 2000 mPa·s, yet more preferably 10 mPa·s to 800 mPa·s and particularly preferably 10 mPa·s to 100 mPa·s. By using a slurry having such viscosity a thin catalyst layer becomes readily formed on the surface of the internal pores of the partition wall 16. A thickener and/or dispersant may be incorporated into the slurry in order to realize such slurry viscosity. Examples of the thickener include cellulosic polymers such as carboxymethyl cellulose (CMC), methyl cellulose (MC), hydroxypropylmethyl cellulose (HPMC), hydroxyethylmethyl cellulose (HEMC) and the like. The content of the thickener in the total solids of the slurry is not particularly limited so long as the viscosity of the slurry satisfies the above ranges, and is about 0.5 mass % to 10 mass %, preferably 1 mass % to 5 mass %, more preferably 1.1 mass % to 3 mass %. The slurry viscosity can be measured using a commercially available shear viscometer at normal temperature. For instance, the viscosity can be measured easily within such a shear rate range by using a standard dynamic viscoelasticity measuring device (rheometer) in the relevant technical field. Herein, the term "normal temperature" denotes a temperature range of 15° C. to 35° C., typically a temperature range of 20° C. to 30° C. (for instance, 25° C.).

Another suitable condition for realizing the average occupation ratio of the catalyst layer disclosed herein involves setting the average particle size of the particles (typically, the carrier powder on which the noble metal is supported) in the slurry to be about 1/50 to 1/3 of the average pore diameter (median value: D50 diameter) of the partition wall 16. The average particle size of the particles in the slurry is more preferably about 1/40 to 1/5, and yet more preferably about 1/30 to 1/10, of the average pore diameter of the partition wall 16. In a case where for instance the average pore diameter of the partition wall 16 is 15 μm to 20 μm, the average particle size of the particles in the slurry can be set to 0.3 μm to 3 μm (preferably 0.4 μm to 1 μm, more preferably 0.5 μm to 0.7 μm). Within such a range of average particle size of the particles in the slurry, a thin the catalyst layer becomes formed in the internal pores of the partition wall 16. The average particle size (median value: D50 diameter) of the particles in the slurry can be grasped on the basis of a laser diffraction-scattering method.

To form the catalyst layer 20, the slurry is applied onto the portion of the substrate 10 (FIG. 2) constituting the exhaust gas inflow end section, and is suctioned from the other end portion (i.e. the portion of the substrate 10 constituting the exhaust gas outflow end section). As a result of such suction, the slurry is caused to flow into the pores of the partition wall 16 from the surface of the partition wall 16 in contact with the inlet cells 12 (FIG. 3) towards the outlet cells 14 (FIG. 3). In a case where the catalyst layer 20 is formed not only in the inlet regions 16a of the partition wall 16 but in the outlet regions 16b as well, the slurry may be applied, as needed, onto the portion of the substrate 10 constituting the exhaust gas outflow end section, and be suctioned from the other end portion (i.e. the portion of the substrate 10 constituting the exhaust gas inflow end section). As a result of such suction, the slurry is caused to flow into the pores of the partition wall 16 from the surface of the partition wall 16 in contact with the outlet cells 14 (FIG. 3) towards the inlet cells 12 (FIG. 3). Once the slurry has been thus caused to flow into the pores of the partition wall 16, the slurry may then be dried and fired. The catalyst layer 20 becomes held as a result on the wall surface of the pores of the partition wall 16.

The suction speed (wind speed) of the slurry may be adjusted as appropriate in such a manner that the slurry is spread thinly on the surface of the internal pores of the partition wall. In a preferred aspect, the suction speed of the slurry can be set to about 20 m/s or higher (for instance, 20 m/s to 80 m/s), preferably 25 m/s or higher. Through suction of the slurry at such a high speed, the slurry readily spreads thinly over the surface of the internal pores of the partition wall, and a catalyst layer having the above-described average occupation ratio can be yet better realized. The suction time of the slurry is not particularly limited, but is appropriately set to lie in the range of about 1 second to 120 seconds. Suitable examples of the technology disclosed herein include an instance where the suction speed of the slurry is 20 m/s to 80 m/s and the suction time of the slurry is 1 second to 120 seconds; and an instance where the suction speed of the slurry is 25 m/s to 50 m/s and the suction time of the slurry is 10 seconds to 120 seconds. A thin catalyst layer can be formed yet more stably within such ranges of suction speed and suction time of the slurry.

In a case where the slurry is applied onto the portion of the substrate 10 constituting the exhaust gas inflow end section and is suctioned from the other end (i.e. the portion of the substrate 10 constituting the exhaust gas outflow end section), the slurry is preferably suctioned in such a manner that the latter coats a portion (coats the interior of the pores in that portion) corresponding to up to at least 50% (for instance, 50% to 100%) of the thickness of the partition wall 16, from the surface of the partition wall 16 in contact with the inlet cells 12 towards the outlet cells 14. In a case where the slurry is applied, as needed, onto the portion of the substrate 10 constituting the exhaust gas outflow end section and is suctioned from the other end (i.e. the portion of the substrate 10 constituting the exhaust gas inflow end section), the slurry is preferably suctioned in such a manner that the latter coats a portion (coats the interior of the pores in that portion) corresponding to up to at least 50% (for instance, 50% to 100%) of the thickness of the partition wall 16, from the surface of the partition wall 16 in contact with the outlet cells 14 towards the inlet cells 12.

Further, the technology disclosed herein affords also a method for producing a particulate filter in which, in the thickness direction of the partition wall, the porosity of the internal pores in the inlet regions corresponding to up to 1/2 of the thickness of the partition wall from the surface of the partition wall in contact with the inlet cells towards the outlet cells, is 25% or higher, and the average occupation ratio of the catalyst layer held in the internal pores is 75% or lower.

This production method includes the steps of: preparing (procuring, producing or the like) a substrate of wall flow structure having inlet cells in which only an exhaust gas inflow end section is open, outlet cells which are adjacent to the inlet cells and in which only an exhaust gas outflow end section is open, and a porous partition wall that partitions the inlet cells and the outlet cells;

applying a slurry for catalyst layer formation onto a portion of the substrate constituting the exhaust gas inflow end section, and suctioning the slurry for catalyst layer formation from the other end portion (i.e. the portion of the substrate constituting the exhaust gas outflow end section); and drying and firing the substrate into which the slurry has been suctioned.

The viscosity of the slurry for catalyst layer formation at a shear rate of 4 $s^{-1}$ is set to be 2000 mPa·s or lower. In a preferred aspect, the suction speed (wind speed) of the slurry is set to be 20 m/s or higher. Further, in a preferred aspect, the average particle size of the particles in the slurry is set to be about 1/40 to 1/5 of the average pore diameter of the partition wall. A filter produced in accordance with such a method can be suitably used as a particulate filter in an exhaust gas purification device.

In this particulate filter 100, exhaust gas flows in through the inlet cells 12 of the substrate 10, as illustrated in FIG. 3. The exhaust gas having flowed in through the inlet cells 12 passes through the porous partition wall 16 and reaches the outlet cells 14. The arrows in FIG. 3 denote the route along which the exhaust gas that flows in through the inlet cells 12 reaches the outlet cells 14 by traversing the partition wall 16. The partition wall 16 has a porous structure; as the exhaust gas passes through the partition wall 16, therefore, the particulate matter (PM) becomes trapped at the surface of the partition wall 16 and in the pores inside the partition wall 16. As illustrated in FIG. 4, the catalyst layer 20 is provided in the pores of the partition wall 16, and hence harmful components in the exhaust gas are purified as the exhaust gas passes through the interior of the pores 18 of the partition wall 16. In this case, since the catalyst layer 20 contains, as a carrier, the OSC material having oxygen storage capacity, harmful components in the exhaust gas can be effectively purified. Further, the porosity of the internal pores in the inlet regions 16a of the partition wall 16 is 25% or higher, and the average occupation ratio of the catalyst layer 20 held in the internal pores 18 is 75% or lower. Therefore, peeling of the catalyst layer 20 can be effectively suppressed, and the purification performance can be maintained stably over long periods of time, despite the fact that the OSC material is used as a carrier. The exhaust gas that reaches the outlet cells 14 by traversing the partition wall 16 is then discharged out of the filter 100 through the opening on the exhaust gas outflow side.

Test examples pertaining to the present invention will be explained next, but the invention is not meant to be limited to the test examples illustrated below.

Example 1

Figure 5:
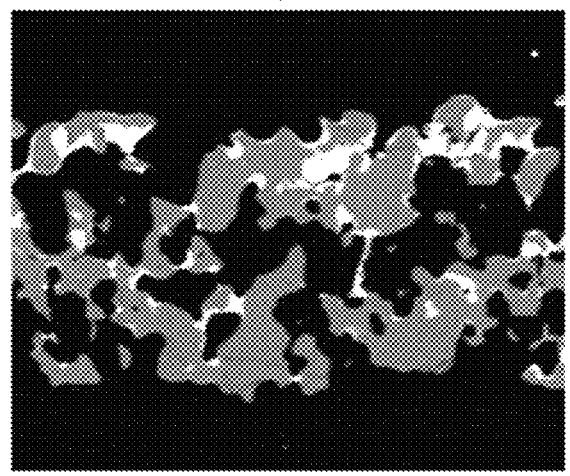
FIG. 5 is a cross-sectional SEM image of a substrate of Example 1.

A ceria-zirconia complex oxide (CZ) as a carrier was prepared and was impregnated with a solution of Rh nitrate as a noble metal catalyst solution; thereafter, the solution was evaporated to dryness, to prepare thereby a Rh/CZ carrier powder carrier powder having Rh supported thereon. Further, alumina as a carrier was prepared and was impregnated with a solution of Rh nitrate as a noble metal catalyst solution; thereafter, the solution was evaporated to dryness, to prepare thereby a Rh/alumina carrier powder having Rh supported thereon. A slurry for catalyst layer formation was then prepared by mixing 80 parts by mass of the Rh/CZ carrier powder, 20 parts by mass of the Rh/alumina carrier powder, 3 parts by mass of CMC as a thickener and 300 parts by mass of deionized water. The viscosity of the slurry at a shear rate of 4 $s^{-1}$ was 1600 mPa·s, and the average particle size of the particles in the slurry was 0.7 μm. Next, the slurry was applied onto a portion of a cordierite substrate 10 (wall flow-type substrate illustrated in FIG. 2 and FIG. 3: diameter 103 mm, total length 100 mm) constituting the exhaust gas inflow end section, and was suctioned from the other end portion (i.e. the portion of the substrate 10 constituting the exhaust gas outflow end section), to cause as a result the slurry to flow into the pores of the partition wall 16. The suction conditions were set in such a manner that the slurry coated the portion (the interior of the pores in that portion) corresponding to up to 70% of the thickness of the partition wall 16, from the surface at which the partition wall 16 is in contact with the inlet cells 12 towards the outlet cells 14. This was followed by drying and firing, to form as a result the catalyst layer 20 inside the pores of the partition wall 16. The suction speed was set to 25 m/s and the suction time to 10 seconds. The coating amount of the catalyst layer per L of volume of the substrate was set to 100 g/L. A particulate filter provided with the catalyst layer 20 was obtained as a result of the above procedure. The porosity of the inlet regions 16a in the substrate was 82.7%. The average occupation ratio of the catalyst layer 20 held in the internal pores in the inlet regions 16a was 17.3%. FIG. 5 illustrates a cross-sectional SEM image of the substrate of Example 1.

Example 2

Figure 6:
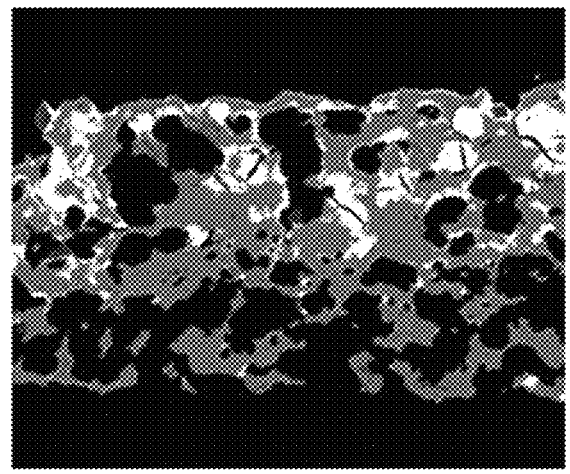
FIG. 6 is a cross-sectional SEM image of a substrate of Example 2.

In the present example, the porosity of the internal pores in the inlet regions 16a was set to 52.2%, and conditions such as viscosity and suction speed of the slurry were tweaked, to bring thereby the average occupation ratio of the catalyst layer 20 held in the internal pores to 47.8%. Otherwise a particulate filter was produced in accordance with the same procedure as in Example 1. FIG. 6 illustrates a cross-sectional SEM image of the substrate of Example 2.

Example 3

Figure 7:
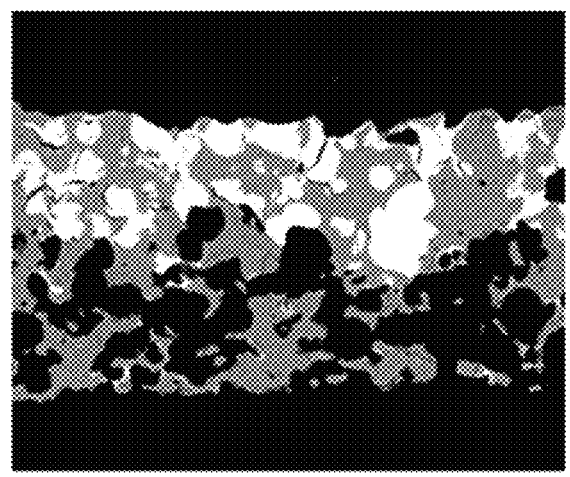
FIG. 7 is a cross-sectional SEM image of a substrate of Example 3.

In the present example, the porosity of the internal pores in the inlet regions 16a was set to 29.9%, and conditions such as viscosity and suction speed of the slurry were tweaked, to bring thereby the average occupation ratio of the catalyst layer 20 held in the internal pores to 71.1%. Otherwise a particulate filter was produced in accordance with the same procedure as in Example 1. FIG. 7 illustrates a cross-sectional SEM image of the substrate of Example 3.

Example 4

Figure 8:
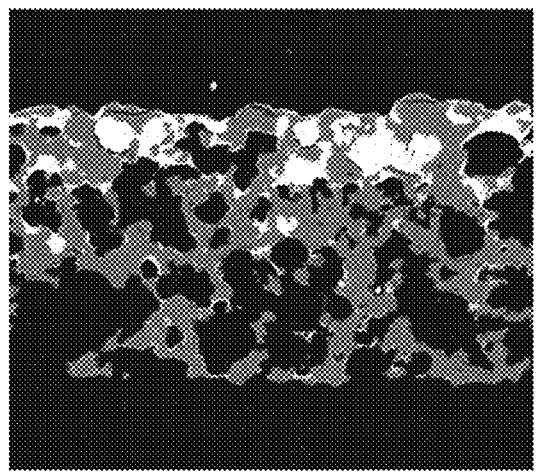
FIG. 8 is a cross-sectional SEM image of a substrate of Example 4.

In the present example, a catalyst layer was formed using 20 parts by mass of the Rh/CZ carrier powder instead of 20 parts by mass of the Rh/alumina carrier powder (i.e. the total amount of the Rh/CZ carrier powder was set to 100 parts by mass). In the present example, moreover, the porosity of the internal pores in the inlet regions 16a was set to 61.3%, and conditions such as viscosity and suction speed of the slurry were tweaked, to bring thereby the average occupation ratio of the catalyst layer 20 held in the internal pores to 38.7%. Otherwise a particulate filter was produced in accordance with the same procedure as in Example 1. FIG. 8 illustrates a cross-sectional SEM image of the substrate of Example 4.

Comparative Example 1

Figure 9:
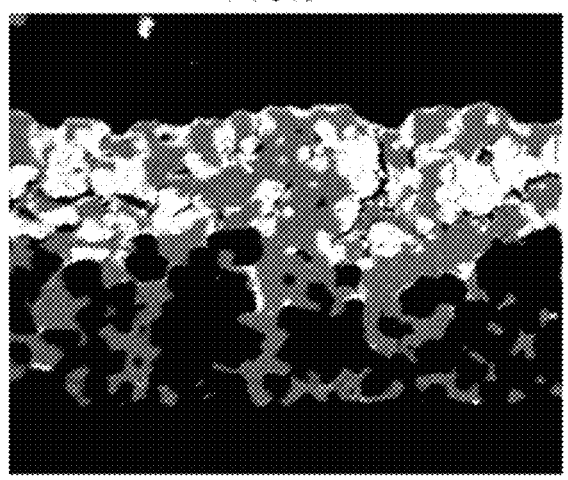
FIG. 9 is a cross-sectional SEM image of a substrate of Comparative example 1.

In the present example, the porosity of the internal pores in the inlet regions 16a was set to 9.0%, the viscosity of the slurry was set to 2500 mPa·s, and the suction speed to 15 m/s, to bring thereby the average occupation ratio of the catalyst layer 20 held in the internal pores to 91.0%. Otherwise a particulate filter was produced in accordance with the same procedure as in Example 1. FIG. 9 illustrates a cross-sectional SEM image of the substrate of Comparative example 1.

(Peeling Rate)

The peeling rate of the catalyst layer in the filters of the examples was measured. Specifically, the filter of each example was thoroughly dried until there was no evaporating liquid component, and mass (A) was measured thereafter. This was followed by a thermal treatment for 5 hours at 1000° C. in air. The filter after the thermal treatment was cooled to 500° C. or less, and the side faces of the filter were tapped five times with a bar. The filter was thoroughly dried once more, until there was no evaporating liquid component, and mass (B) was measured thereafter. A value calculated as (A−B)/A×100 was taken as the peeling rate (%) of the catalyst layer. The results are given in Table 1.

TABLE 1

|  | Porosity (%) | Average occupation ratio (%) | Peeling rate (%) |
| --- | --- | --- | --- |
| Example 1 | 82.7 | 17.3 | 0.06 |
| Example 2 | 52.2 | 47.8 | 0.06 |
| Example 3 | 28.9 | 71.1 | 0.14 |
| Example 4 | 61.3 | 38.7 | 0.08 |
| Comp. example 1 | 9.0 | 91.0 | 0.23 |

As Table 1 reveals, Examples 1 to 4, where the porosity of the internal pores in the inlet regions was 25% or higher and the average occupation ratio of the catalyst layer held in the internal pores was 75% or lower, exhibited a trend of lower peeling rate versus Comparative example 1. These results confirmed that peeling of the catalyst layer can be suppressed by setting the porosity of the internal pores in the inlet regions to be 25% or higher and setting the average occupation ratio or the catalyst layer held in the internal pores to be 75% or lower. Example 4, in which an alumina-less catalyst layer was used, exhibited a trend of lower peeling rate versus Comparative example 1, despite the fact that the CZ carrier alone, and no alumina, was used herein. It is found that the configuration of the present aspect has high technical value in terms of making it possible to suppress peeling of the catalyst layer while enhancing OSC capacity and reducing pressure loss, as a result of an increase in the proportion of the CZ carrier without using alumina.

Several variations of the particulate filter 100 and of the exhaust gas purification device 1 provided with the particulate filter 100 have been illustrated above, but the structure of the particulate filter 100 and of the exhaust gas purification device 1 is not limited to any one of the embodiments described above.

For instance, the shape and structure of the various members and sites of the exhaust gas purification device 1 may be modified. In the example illustrated in FIG. 1 the catalyst unit is provided upstream of the filter unit, but the catalyst unit may be omitted. The exhaust gas purification device 1 is particularly suitable as a device for purifying harmful components in exhaust gas having a comparatively high exhaust temperature, for instance in gasoline engines. However, the exhaust gas purification device 1 according to the present invention is not limited to being used to purify harmful components in exhaust gas of gasoline engines, and can be used in various applications that involve purifying harmful components in exhaust gas emitted from other engines (for instance, diesel engines).

What is claimed is:

1. An exhaust gas purification device that is disposed in an exhaust passage of an internal combustion engine and that purifies exhaust gas emitted from the internal combustion engine, the exhaust gas purification device comprising:
a substrate of wall flow structure having inlet cells in which only an exhaust gas inflow end section is open, outlet cells which are adjacent to the inlet cells and in which only an exhaust gas outflow end section is open, and a porous partition wall that partitions the inlet cells and the outlet cells; and
a catalyst layer held in internal pores of the partition wall, wherein the catalyst layer contains at least a carrier made up of an OSC material having oxygen storage capacity, and a noble metal supported on the carrier; and
in the thickness direction of the partition wall, the porosity of the internal pores in inlet regions corresponding to up to ½ of the thickness of the partition wall from the surface of the partition wall in contact with the inlet cells towards the outlet cells, is 25% or higher, and an average occupation ratio of the catalyst layer held in the internal pores is 75% or lower.

2. The exhaust gas purification device according to claim 1, wherein the proportion of the OSC material in the total mass of carrier contained in the catalyst layer is 70 mass % or higher.

3. The exhaust gas purification device according to claim 1, wherein the catalyst layer is an alumina-less layer containing no alumina.

4. The exhaust gas purification device according to claim 1, wherein the porosity of the internal pores in the inlet regions is 50% or higher, and the average occupation ratio of the catalyst layer held in the internal pores is 50% or lower.

5. The exhaust gas purification device according to claim 1, wherein the OSC material is made up of $CeO_2$ or a $CeO_2$—$ZrO_2$ complex oxide.

6. The exhaust gas purification device according to claim 1, wherein the internal combustion engine is a gasoline engine.

* * * * *